United States Patent
Materne et al.

(12) 
(10) Patent No.: US 6,172,138 B1
(45) Date of Patent: *Jan. 9, 2001

(54) REINFORCED ELASTOMER PREPARATION, ELASTOMER COMPOSITE AND TIRE HAVING COMPONENT THEREOF

(75) Inventors: Thierry Florent Edmé Materne, Fairlawn, OH (US); Giorgio Agostini, Colmar-Berg; Georges Marcel Victor Thielen, Ettelbruck, both of (LU)

(73) Assignee: The Goodyear Tire & Rubber Company, Akron, OH (US)

( * ) Notice: Under 35 U.S.C. 154(b), the term of this patent shall be extended for 0 days.

This patent is subject to a terminal disclaimer.

(21) Appl. No.: 09/190,492

(22) Filed: Nov. 12, 1998

(51) Int. Cl.$^7$ ................. C08K 9/06; C08K 3/34
(52) U.S. Cl. ............ 523/212; 524/492; 524/493; 152/151
(58) Field of Search ................. 524/382, 394, 524/398, 399, 265, 430, 437, 724, 750, 585, 589, 492, 493; 523/212, 351

(56) References Cited

U.S. PATENT DOCUMENTS

| | | | |
|---|---|---|---|
| 4,957,970 | * 9/1990 | Holsapple et al. | 525/99 |
| 5,001,171 | * 3/1991 | Bohm et al. | 523/206 |
| 5,440,064 | * 8/1995 | Agostini et al. | 556/427 |
| 5,580,919 | * 12/1996 | Agostini et al. | 524/430 |
| 5,597,882 | * 1/1997 | Schiller et al. | 528/18 |
| 5,674,932 | * 10/1997 | Agostini et al. | 524/430 |
| 5,760,110 | * 6/1998 | Zimmer et al. | 524/83 |
| 5,798,405 | * 8/1998 | Zimmer et al. | 524/496 |

OTHER PUBLICATIONS

"Reinforcement of General Purpose Grade Rubber by Silica Generated in–Situ", by Ikeda Kohjiya; Rapra Abstracts, vol. 36, No. 12, Dec. 1999 (1999–12), p. 82. XP002128929.

"Effect of Catalyst on In Situ Silica Reinforcements of Styrene/Butadiene Rubber Vulcanizate by the Sol–gel Reaction of Tetraethoxysilane" by Yuko Ikeda; *The Journal of Materials Chemistry, GB, The Royal Society of Chemistry, Cambridge*, vol. 7, No. 3, (Mar. 1, 1997), pp. 455–458 XP000693116.

"Silica and Silane Coupling Agent for In Situ Reinforcement of Acrylonitrile/Butadiene Rubber" by K. Murakami et al; *Rubber Chemistry and Technology, US, Rubber Division ACS., Akron*, vol. 72, No. 1, 1999, pp. 119–129. XP000874205.

* cited by examiner

*Primary Examiner*—Edward J. Cain
*Assistant Examiner*—Katarzyna Wyrozebski
(74) *Attorney, Agent, or Firm*—Henry C. Young, Jr.

(57) ABSTRACT

Preparation of an elastomer which contains a dispersion of filler reinforcement by forming a filler reinforcement in-situ within the elastomer host, the resulting elastomer/filler composite and tire having component which contains such reinforced elastomer. The invention includes a rubber composition of at least two elastomers wherein one of said elastomers is a pre-formed composite of elastomer and in-situ formed filler reinforcement. A tire having a component of such rubber composition, particularly a tire tread, is specifically contemplated.

112 Claims, No Drawings

REINFORCED ELASTOMER PREPARATION, ELASTOMER COMPOSITE AND TIRE HAVING COMPONENT THEREOF

This specification is related to two other specifications in a series of three specifications of which are Ser. Nos. 09/190,493, 09/190,492 and 09/190,494, all pending filed in the U.S. Patent and Trademark Office on the same date.

FIELD

This invention relates to preparation of an elastomer which contains a dispersion of filler reinforcement by forming a filler reinforcement in-situ within the elastomer host, the resulting elastomer/filler composite and tire having component which contains such reinforced elastomer.

This invention further relates to a rubber composition of at least two elastomers wherein one of said elastomers is a pre-formed composite of elastomer and in-situ formed filler reinforcement. The invention also relates to a tire having a component of such rubber composition. It particularly relates to a tire with a tread of such composition.

BACKGROUND

Elastomers are conventionally reinforced with particulate reinforcing fillers such as, for example, carbon black and sometimes precipitated silica.

It is sometimes difficult to obtain an adequate, homogeneous dispersion of the reinforcing filler, particularly silica, in the rubber composition, by conventionally blending the rubber and filler under high shear conditions.

Accordingly, however, an adequate, homogeneous, dispersion of the reinforcing filler particles within the rubber composition is sometimes desired.

In one aspect, it has heretofore been proposed to create a dispersion of silica in polysiloxane polymers such as poly (dimethylsiloxane), or (PDMS), elastomer(s) by in-situ formation of silica from a base-catalyzed sol-gel conversion of tetraethoxysilane (TEOS). For example see "Precipitation of Silica-Titania Mixed-Oxide Fillers Into Poly (dimethylsiloxane) Networks" by J. Wen and J. Mark; Rubber Chem and Tech, (1994), volume 67, No.5, (pages 806–819).

A process of preparing rubber products has been suggested by mixing the TEOS with a solution of unvulcanized rubber in an organic solvent and subjecting it to a sol-gel condensation reaction to provide a finely powdered silica. For example, see Japanese patent application publication 93/02152.

Further, a composition has been suggested as comprising a base rubber and globular silica made by a sol-gel method and having an average particle diameter of 10–30 microns and specific surface area of 400–700 square meters per gram. The composition is suggested for use in a flap of a tire. For example, see Japanese patent application publication 6145429.

Also, a tread rubber composition has been proposed as a composition of a base rubber and spherical silica prepared by a sol-gel transformation. For example, see Japanese patent application publication 6116440 and corresponding Japanese patent publication 2591569.

Further, an in-situ formation of silica from a sol gel reaction of TEOS in an organic solution of styrene/butadiene rubber, onto which a bis(3-triethoxysilylpropyl) tetrasulfide has been previously grafted to form triethoxysilyl groups, has been reported. ("The Effect of Bis(3-triethoxysilylpropyl) Tetrasulfide on Silica Reinforcement of Styrene-Butadiene Rubber" by Hashim, et al, in Rubber Chem & Tech, 1998, Volume 71, pages 289–299).

In the description of this invention, the term "phr" where used herein, and according to conventional practice, refers to "parts of a respective material per 100 parts by weight of rubber, or elastomer".

In the description of this invention, the terms "rubber" and "elastomer" if used herein, may be used interchangeably, unless otherwise prescribed. The terms "rubber composition", "compounded rubber" and "rubber compound", if used herein, are used interchangeably to refer to "rubber which has been blended or mixed with various ingredients and materials" and such terms are well known to those having skill in the rubber mixing or rubber compounding art.

SUMMARY AND PRACTICE OF THE INVENTION

In accordance with this invention, a method is provided of preparing an elastomer/filler composite as a dispersion of a filler formed in-situ within an elastomer host which comprises:

A) blending a filler precursor, condensation reaction promoter and elastomer host selected from elastomer host (A) and elastomer host (B), in a medium of (1) an organic solvent solution of said elastomer host or (2) an aqueous latex of said elastomer host, preferably in an organic solvent solution, to initiate a condensation reaction of said filler precursor and, for elastomer host (A), and optionally for elastomer host (B), subsequently adding and reacting an organosilane material with said filler/filler precursor prior to the completion of said condensation reaction; followed by recovering the resulting elastomer/filler composite; or B) blending, in an internal rubber mixer, a filler precursor, condensation reaction promoter and elastomer host selected from elastomer host (A) and elastomer host (B), to initiate a condensation reaction of said filler precursor and, for elastomer host (A), and optionally for elastomer host (B), subsequently adding and reacting, in an internal rubber mixer, an organosilane material with said filler/filler precursor prior to the completion of said condensation reaction; followed by recovering the resulting elastomer/filler composite; or C) immersing an elastomer host selected from elastomer host (A) and elastomer host (B) in a liquid filler precursor, and allowing said filler precursor to imbibe into said elastomer host to cause the elastomer host to swell, applying a condensation reaction promoter to said swelled elastomer host to initiate a condensation reaction of said filler precursor and, for elastomer host (A), and optionally for elastomer host (B), subsequently adding and reacting an organosilane material with said filler/filler precursor prior to the completion of said condensation reaction; followed by recovering the resulting elastomer/filler composite; wherein said elastomer host (A) is selected from at least one of homopolymers of conjugated dienes, copolymers of conjugated dienes, copolymers of conjugated diene with a vinyl aromatic compound, preferably selected from styrene and alpha-methylstyrene and more preferably styrene; wherein said elastomer host (B) is selected from at least one alkoxy metal end functionalized diene-based elastomer having, for example, a general formula (I):

$$\text{elastomer-X-(OR)}_n \qquad (I)$$

wherein X is selected from silicon, titanium, aluminum and boron, preferably silicon, R is selected from alkyl radicals having from 1 to 4 carbon atoms, preferably methyl, ethyl, n-propyl, isopropyl, n-butyl and isobutyl radicals, more preferably ethyl radicals, and n is 3 for silicon and titanium and is 2 for aluminum and boron, and wherein said elastomer is selected from at least one of homopolymers of conjugated dienes, copolymers of conjugated dienes, copolymers of conjugated diene with a vinyl aromatic compound, preferably selected from styrene and alpha-methylstyrene, and more preferably styrene; and wherein said filler precursor is at least one material selected from the formulas (IIA), (IIB) and (IIC):

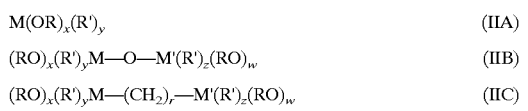

wherein M and M' are the same or different and are selected from silicon, titanium, zirconium, boron and aluminum, preferably silicon, where R and R' are individually selected from alkyl radicals having from 1 to 4 carbon atoms, preferably from methyl, ethyl, n-propyl, isopropyl, n-butyl and isobutyl radicals, wherein R is preferably an ethyl radical and R' is preferably a methyl radical, and wherein the sum of each of x+y and w+z integers is equal to 3 or 4 depending upon the valence of the associated M or M', as the case may be and is, therefore, 4 except when its associated M or M' is boron or aluminum for which it is 3, and wherein r is from 1 to 15, preferably from 1 to 6;

wherein said organosilane is at least one material selected from formula (III), (IV) and (V), namely:

an organosilane polysulfide of formula (III) as:

$$Z-R^1-S_m-R^1-Z \qquad (III)$$

wherein m is a number in a range of from 2 to about 8 and the average for m is in a range of (a) about 2 to about 2.6 or (b) about 3.5 to about 4.5;

wherein Z is represented by the following formulas of which is preferably (Z3):

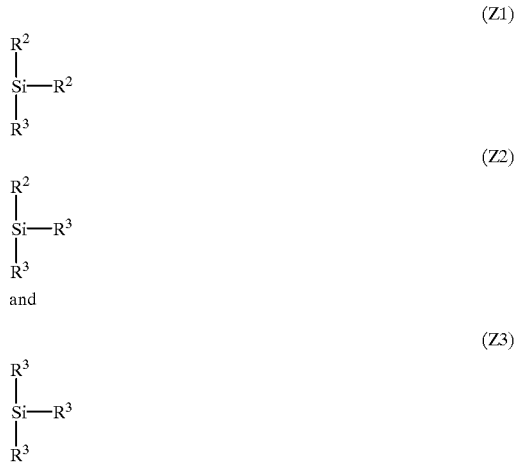

wherein $R^2$ is the same or different radical and is individually selected from alkyl radicals having 1 to 4 carbon atoms and phenyl radical, preferably from methyl and ethyl radicals; $R^3$ is the same or different alkoxy groups wherein the alkyl radicals of the alkoxy group(s) are individually selected from alkyl radicals having 1 to 4 carbon atoms, namely from methyl, ethyl, n-propyl, isopropyl, n-butyl and isobutyl radicals, and preferably an ethyl radical, whereby (Z) is preferably (Z3) as a triethoxysilane radical; and $R^1$ is a radical selected from the group consisting of a substituted or unsubstituted alkyl radicals having a total of 1 to 18 carbon atoms and a substituted or unsubstituted aryl radical having a total of 6 to 12 carbon atoms wherein $R^1$ is preferably selected from ethyl, propyl and butyl radicals;

an alkyl alkoxy silane of formula (IV) as:

$$(OR^4)_3-Si-R^5 \qquad (IV)$$

where $R^4$ may be the same or different alkyl radical having from 1 to 3 carbon atoms selected from methyl, ethyl, n-propyl and isopropyl radicals and $R^5$ is selected from alkyl radicals having from 1 to 18, preferably from 8 to 18, carbon atoms and aryl radicals or alkyl substituted aryl radicals having from 6 to 12 carbon atoms, wherein $R^5$ is preferably an alkyl radical; and a functional organosilane of formula (V) as:

$$(OR^6)_3-Si-(CH_2)_y-Y \qquad (V)$$

wherein $R^6$ is the same or different alkyl radicals having from 1 to 3, preferably from 1 to 2, carbon atoms selected from methyl, ethyl, n-propyl and isopropyl radicals, preferably an ethyl radical, y is an integer of from 1 to 12, alternatively from 2 to 4, and Y is selected from primary amino, mercapto, epoxide, thiocyanato, vinyl, methacrylate, ureido, isocyanato and ethylene diamine radicals;

In further accordance with this invention, a rubber composition prepared according to said method(s) is provided.

In additional accordance with this invention, an article is provided having at least one component comprised of said rubber composition.

In further accordance with this invention, said article is selected from industrial belts and hoses.

In additional accordance with this invention, a tire is provided having at least one component comprised of said rubber composition.

In further accordance with this invention, a tire is provided having a tread comprised of said rubber composition.

It is important to appreciate that creation of a elastomer/filler composite is accomplished by first initiating a condensation reaction of the filler precursor within a diene-based elastomer host and, prior to completion of the reaction, reacting an organosilane with the in-situ forming filler material.

In this manner, a quasi sol gel reaction is used, insofar as the initial portion of the condensation reaction is concerned, for the in-situ formation of the filler dispersion within the host elastomer.

It is considered herein that a significant departure from prior practice is the reaction of the indicated organosilane material(s) with the in-situ formed condensation product, all within the elastomer host, to form an elastomer reinforcement dispersion of resulting filler material in an unvulcanized elastomer.

In this manner, then, a product of the condensation reaction produced product of a formula (II) material (eg:

condensation reaction of TEOS) and the organosilane co-reactant of formula (III), (IV), or (V) to form a filler dispersion in-situ and within the elastomer host which has a capability of further reaction with the host elastomer itself.

A further significant departure from past practice is the in-situ creation of a prescribed filler material, within an alkoxy metal end-functionalized elastomer host, which has a moiety (for example, a trialkoxysilyl or trialkoxytitanyl-moiety) for coupling the elastomer with polar fillers synthesized in-situ and which can, therefore, reduce the need of subsequently adding an additional bifunctional coupling agent,—eg: an organosilane polysulfide—to aid in bonding the in-situ synthesized filler to the elastomer. As a consequence, it is envisioned that, for some circumstances, only a minimal, if any, of such additional bifunctional coupling agent may then be desired.

Various reinforcing fillers may also be subsequently mixed with the elastomer/in-situ formed reinforcing filler composite.

For example, such additional fillers may be carbon black, precipitated silica and other fillers containing hydroxyl groups on their surface such as, for example, aluminum doped precipitated silica and modified carbon blacks, which would have aluminum hydroxide and/or silicon hydroxide on their respective surfaces.

Exemplary of such aluminum doped precipitated silicas are, for example aluminosilicates formed by a co-precipitation of a silicate and an aluminate. An example of modified carbon black is, for example, a carbon black having silicon hydroxide on its outer surface by treatment of carbon black with an organosilane at an elevated temperature or by co-fuming an organosilane and oil at an elevated temperature.

In accordance with this invention, an elastomer blend composition is provided which is comprised of at least two diene-based elastomers of which one elastomer is a pre-formed elastomer/filler dispersion as the said composite of elastomer and dispersion of situ formed filler of this invention comprised of, based on 100 phr of elastomers, (A) about 10 to about 90 phr of at least one diene-based elastomer selected from at least one homopolymer and copolymer of isoprene and 1,3-butadiene and copolymer of at least one diene selected from isoprene and 1,3-butadiene with a vinyl aromatic compound selected from at least one of styrene and alpha-methylstyrene, preferably styrene, and (B) about 90 to about 10 phr of at least one of said pre-formed composite of elastomer/filler, (C) at least one of additional reinforcing filler provided, however, that the total of said in-situ formed filler and said additional reinforcing filler are present in an amount of from about 30 to about 120 phr and where said additional reinforcing filler may be selected, for example, from at least one of precipitated silica, aluminosilicate, carbon black and modified carbon black having hydroxyl groups, eg: hydroxyl and/or silicon hydroxide groups, on its surface and (D) optionally a coupling agent having a moiety reactive with said filler(s) and another moiety interactive with said elastomer(s).

In further accordance with this invention, an article is provided having at least one component comprised of said rubber blend composition.

In additional accordance with this invention, an article selected from industrial belts and hoses is provided having at least one component comprised of said rubber blend composition.

In further accordance with this invention, a tire is provided having at least one component comprised of said rubber blend composition.

In additional accordance with this invention, a tire is provided having a tread comprised of said rubber blend composition.

Representative examples of said filler precursor material of the formula (IIA), are, for example, tetraethoxy ortho silicate, titanium ethoxide, titanium n-propoxide, aluminum tri-sec butoxide, zirconium t-butoxide, zirconium n-butoxide, tetra-n-propoxy zirconium, boron ethoxide, methyl triethoxy silicate and dimethyl diethoxy silicate.

Representative examples of said filler precursor material of the formula (IIB), are, for example, di-s-butoxyaluminoxy triethoxysilane and hexaethoxydisiloxane.

Representative examples of said filler precursor material of the formula (IIC), are, for example, bis(triethoxysilyl) methane and bis(triethoxysilyl) ethane.

Representative examples of the organosilane polysulfide of formula (III) are, for example:

(A) organosilane disulfide materials containing from 2 to 4 sulfur atoms, with an average of from 2 to 2.6, in their polysulfidic bridge, and (B) organosilane polysulfide materials containing from 2 to 8 sulfur atoms, with an average of from 3.5 to 4.5, in their polysulfidic bridge;

wherein, the alkyl radical for the alkoxy component of the disulfide and polysulfide materials selected from methyl, ethyl and propyl radicals, preferably an ethyl radical, and the alkyl radical for the silyl component is selected from ethyl, propyl, particularly n-propyl, and butyl radicals, preferably an n-propyl radical.

It is to be appreciated that the activity of the sulfur bridge of the organosilane disulfide material(A) and organosilane polysulfide material (B) is very different. In particular, the sulfur atoms of organosilane disulfide material (A), which is primarily a disulfide, have much stronger bonds to each other than the sulfur atoms in the bridge of the organosilane polysulfide material (B). Thus, the organosilane polysulfide material (B) can be somewhat of a sulfur donor (a provider of free sulfur) in a rubber composition at elevated temperatures whereas the sulfur atoms of the organosilane disulfide material (A) are not considered herein to be such a sulfur donor. This phenomenon can have a substantial effect upon a formulation of a sulfur curable rubber composition.

While a bis(3-alkoxysilylalkyl)polysulfide material such as, for example, a bis-(3-triethoxysilylpropyl) disulfide may be a preferable organosilane disulfide (A), representative examples of such organosilane disulfide(A) are 2,2'-bis(trimethoxysilylethyl) disulfide;
3,3'-bis(trimethoxysilylpropyl) disulfide;
3,3'-bis(triethoxysilylpropyl) disulfide;
2,2'-bis(triethoxysilylethyl) disulfide;
2,2'-bis(tripropoxysilylethyl) disulfide;
2,2'-bi(tri-sec.butoxysilylethyl) disulfide;
3,3'-bis(tri-t-butoxyethyl) disulfide;
3,3'-bis(triethoxysilylethyl tolylene) disulfide;
3,3'-bis(trimethoxysilylethyl tolylene) disulfide;
3,3'-bis(triisopropoxypropyl) disulfide;
3,3'-bis(trioctoxypropyl) disulfide;
2,2'-bis(2'-ethylhexoxysilylethyl) disulfide;
2,2'-bis(dimethoxy ethoxysilylethyl) disulfide;
3,3'-bis(methoxyethoxypropoxysilylpropyl) disulfide;
3,3'-bis(methoxy dimethylsilylpropyl) disulfide;
3,3'-bis(cyclohexoxy dimethylsilylpropyl) disulfide;
4,4'-bis(trimethoxysilylbutyl) disulfide;
3,3'-bis(trimethoxysilyl-3-methylpropyl) disulfide;
3,3'-bis(tripropoxysilyl-3-methylpropyl) disulfide;

3,3'-bis(dimethoxy methylsilyl-3-ethylpropyl) disulfide;
3,3'-bis(trimethoxysilyl-2-methylpropyl) disulfide;
3,3'-bis(dimethoxyphenylsilyl-2-methylpropyl) disulfide;
3,3'-bis(trimethoxysilylcyclohexyl) disulfide;
12,12'-bis(trimethoxysilyldodecyl) disulfide;
12,12'-bis(triethoxysilyldodecyl) disulfide;
18,18'-bis(trimethoxysilyloctadecyl) disulfide;
18,18'-bis(methoxydimethylsilyloctadecyl) disulfide;
2,2-'-bis(trimethoxysilyl-2-methylethyl) disulfide;
2,2'-bis(triethoxysilyl-2-methylethyl) disulfide;
2,2'-bis(tripropoxysilyl-2-methylethyl) disulfide; and
2,2'-bis(trioctoxysilyl-2-methylethyl) disulfide.

Preferred of such organosilane disulfides are:
3,3'-bis(trimethoxysilylpropyl) disulfide;
3,3'-bis(triethoxysilylpropyl) disulfide;
3,3'-bis(methoxy dimethylsilylpropyl) disulfide, and
3,3'-bis(cyclohexoxy dimethylsilylpropyl) disulfide.

While a bis(3-alkoxysilylalkyl)polysulfide material such as, for example, a bis-(3-triethoxysilylpropyl) tetrasulfide or trisulfide may be a preferable organosilane polysulfide (B), representative examples of such organosilane polysulfide (B) are:

bis-(3-trimethoxylsilylpropyl) trisulfide,
bis-(3-trimethoxylsilylpropyl) tetrasulfide,
bis-(3-triethoxysilylpropyl) trisulfide,
bis-(3-triethoxysilylpropyl) tetrasulfide,
bis-(3-triethoxysilylethyltolylene) trisulfide and
bis-(3-triethoxysilylethyltolylene) tetrasulfide.

For the alkyl alkoxysilane of Formula (IV) the said aryl or substituted aryl radicals may be, for example, benzyl, phenyl, tolyl, methyl tolyl, and alpha methyl tolyl radicals.

A purpose of the alkyl alkoxysilane is, for example, to design specific in-situ synthesized filler morphology and adhesion to the elastomer host matrix.

Representative examples of alkyl alkoxysilanes are, for example but not intended to be limited to, propyltriethoxysilane, methyltriethoxy silane, hexadecyltriethoxysilane, and octadecyltriethoxysilane.

Representative examples of primary amino functional organosilanes of formula (V) are, for example, 3-amino propyl triethoxysilane, 2-aminoethyl triethoxysilane and 4-aminobutyltriethoxysilane. Representative of mercapto functional organosilanes are, for example, 3-mercapto propyl triethoxysilane, 2-mercaptoethyl triethoxysilane and 4-mercaptobutyl triethoxysilane. Representative of epoxide functional organosilanes is, for example, (3-glycidoxypropyl) triethoxysilane. Representative of thiocyanato functional organosilanes is, for example, 3-thiocyanato propyl triethoxysilane. Representative of vinyl functional organosilanes is, for example, vinyltriethoxysilane. Representative of ureido radicals is ureidopropyltriethoxysilane. Representative of isocyanato functional organosilanes is, for example, 3-isocyanatopropyl triethoxysilane. Representative of ethylene diamine is N(3-triethoxysilyl) propyl ethylenediamine.

A purpose of the functional organosilane of formula (V) is, for example, to aid in the adhesion of the filler to the elastomer host matrix.

In practice the diene based elastomer(s) for elastomer (A) and the elastomer component of elastomer (B) are contemplated as being selected from, for example, homopolymers and copolymers of monomers selected from isoprene and 1,3-butadiene and copolymers of monomers selected from at least one of isoprene and 1,3-butadiene with an aromatic vinyl compound selected from styrene and alpha-methylstyrene, preferably styrene, and mixtures thereof.

Representative of such elastomers, particularly for elastomer (A) are, for example, cis 1,4-polyisoprene, cis 1,4-polybutadiene, isoprene/butadiene copolymers, styrene/butadiene copolymers including emulsion polymerization prepared copolymers and organic solvent solution polymerization prepared copolymers, styrene/isoprene copolymers, 3,4-polyisoprene, trans 1,4-polybutadiene, styrene/isoprene/butadiene terpolymer, high vinyl polybutadiene having from about 35 to about 90 percent vinyl groups, and mixtures thereof.

Representative of elastomer components for elastomer (B) are, for example, organic solution polymerization prepared cis 1,4-polyisoprene, cis 1,4-polybutadiene, isoprene/butadiene copolymers, styrene/butadiene copolymers, styrene/isoprene copolymers, 3,4-polyisoprene, trans 1,4-polybutadiene and styrene/isoprene/butadiene terpolymers, and mixtures thereof.

In the practice of this invention, diene-based elastomers (A) may be used as a tin coupled or tin capped elastomer. Such modified diene-based elastomer may, for example, be prepared by polymerizing or copolymerizing, in an organic solution, monomers selected from one or more diene monomers selected from 1,3-butadiene and isoprene or styrene monomers together with 1,3-butadiene and/or isoprene and modifying the living polymer, before terminating the polymerization, with tin.

Such tin coupled or capped elastomers, may be, for example, cis 1,4-polyisoprene, cis 1,4-polybutadiene, styrene/butadiene copolymers, styrene/isoprene/butadiene terpolymers, isoprene/butadiene copolymers and styrene/isoprene copolymers.

An important and usual characterization of such elastomers is that a major portion, preferably at least about 50 percent, and more generally in a range of about 60 to about 85 percent of the Sn bonds in the elastomer, are bonded to diene units of the copolymer which might be referred to herein as "Sn-dienyl bonds", such as, for example, butadienyl bonds in the case of butadiene terminated polymers.

The modification of the elastomer, such as tin coupling or tin capping, can be accomplished by relatively conventional means and is believed to be well known to those skilled in such art.

For example, a copolymer elastomer can be prepared by copolymerization of styrene with 1,3-butadiene and/or isoprene in an organic solution with an alkyl lithium catalyst. A co-catalyst or catalyst modifier may also be used. Such polymerization methods are well known to those skilled in such art. After formation of the copolymer elastomer, but while the catalyst is still active and, therefore, while the copolymer is still considered a live copolymer capable of further polymerization, the polymerization can be terminated with reacting the live copolymer with a tin compound. Various tin compounds can be used and tin tetrachloride is usually preferred. Thus, taking into account that the valence of tin is four, typically the modified copolymer is considered as being coupled, with an accompanying molecular weight jump, or increase, with the modified copolymer being in what is sometimes referred to as a star shaped, or configured, coupled elastomer. On the other hand, if an trialkyl tin compound is used, then only a single halogen is available and the modified copolymer is a capped copolymer. Such preparation of coupled and capped copolymers prepared by organolithium catalysis is believed to be well known to those having skill in such art. It is to be appreciated that the modified copolymer may be a mixture of coupled and capped copolymer.

Examples of tin modified, or coupled, styrene/butadiene might be found in, for example, U.S. Pat. No. 5,064,910.

The tin coupled polymer or copolymer elastomer can also be tin coupled with an organo tin compound such as, for example, alkyl tin trichloride, dialkyl tin dichloride and trialkyl tin monochloride, yielding variants of a tin coupled copolymer with the trialkyl tin monochloride yielding simply a tin terminated copolymer.

Accordingly, a tin coupled elastomer may be the product of reacting at least one conjugated diene or by reacting styrene together with at least one conjugated diene; wherein said diene is selected from 1,3-butadiene and isoprene, in an organic solvent solution and in the presence of an organolithium based catalyst followed by reacting the live polymer with at least one compound having the formula: $R^7_{4-y}SnX_n$, wherein n is an integer from 1 to and including 4, X is a halogen selected from chlorine, iodine and bromine, preferably chlorine; and $R^7$ is an alkyl radical selected from methyl, ethyl, propyl and butyl radicals.

In another aspect of the invention, as hereinbefore discussed, the diene-based elastomer may be end functionalized as exemplified by formula (I) with, for example, an alkoxysilane unit. Such end functionalization may be accomplished, for example, by quenching an anionic polymerization of the monomers in an organic solvent solution during a formation of a diene-based elastomer using, for example, chlorotriethoxysilane or 3,3' bis(triethoxypropyl) disulfide.

For such end functionalization of elastomers, preferably the elastomers are prepared by organic solvent polymerization and selected from at least one of styrene/butadiene copolymer, isoprene/butadiene copolymer, cis 1,4-polybutadiene, cis 1,4-polyisoprene, styrene/isoprene copolymers, high vinyl polybutadiene having a vinyl content in a range of from about 35 to about 90 and styrene/isoprene/butadiene terpolymer elastomers.

For the carbon black reinforcement having silicon hydroxide on the surface thereof, such modified carbon black may be prepared, for example, by treatment of a reinforcing carbon black with an organo silane at an elevated temperature or by co-fuming an organo silane and an oil as hereinbefore discussed.

In the practice of this invention, as hereinbefore discussed, the in-situ formed filler reinforcement may be formed in an elastomer host which is contained in an organic solvent solution or in a latex, preferably in an organic solvent solution.

For example, the elastomer may be provided in an organic solvent solution by, for example, (A) dissolving the elastomer in a suitable organic solvent, such as for example, toluene, hexane, cyclohexane or THF (tetrahydrofurane) or (B) by providing the elastomer as a cement, or polymerizate, namely in the solution resulting from an organic solvent solution polymerization of appropriate monomers to provide the elastomer in solution. Such organic solvent solution polymerization of monomers to obtain elastomers is well known to those having skill in such art.

Such elastomer may be provided as a latex by polymerizing appropriate monomers in an aqueous soap solution to form the elastomer based latex. Such preparation of latices is well known to those having skill in such art.

Also, in the practice of this invention, the in-situ formed reinforcing filler may also be formed by blending the elastomer and filler pre-cursor(s) and facilitating the said condensation reaction of the filler precursor in an internal rubber mixing apparatus such as, for example, an Banbury type of mixer or in an extruder. Internal rubber and polymer mixers are well known.

Thus, the internal mixer may be, for example, at least one internal batch mixer (eg: Banbury type of rubber mixer) in which the ingredients are introduced, sequentially introduced where appropriate into one or more sequential internal mixing steps and removed from the mixer after the mixing/reaction has reached a desired degree of completion.

Continuous reaction mixing techniques may be also be used. For example, a continuous extruder mixer may be used. Extruder mixers are usually presented as dual screw extruders in which the screws may revolve in a co-rotation mode or a counter rotation mode and raised portions of their respective shafts may intermesh. It is preferred that the screw profile has an L/D (length over diameter) ratio in a range of from 5 to 70 to depending somewhat upon a desired mixing efficiency and degree of ingredient dispersion within the elastomer blend. Such reactive extruder mixing of various elastomers with various ingredients is well known to those having skill in such art. For example, see U.S. Pat. No. 5,711,904. For example, it is contemplated that the extruder may be a dual screw extruder where the elastomer host, filler precursor and condensation promoter are initially introduced into the extruder mixer and the optional organosilane is subsequently added to the reaction mixture within the extruder after about 50 to about 70 percent of the overall, total, reaction time and at a corresponding spaced apart length of the extruder from the said initial introduction of elastomer and precursor.

For preparation of the elastomer/filler composite by immersion of the elastomer host in a liquid filler precursor, the elastomer is simply allowed to swell in the presence of and consequently to absorb the liquid precursor. Accordingly, the liquid precursor is simply imbibed into to the elastomer host. Usually, the amount of liquid precursor is adjusted so that little, if any, liquid precursor remains unabsorbed. Otherwise, either the swelled elastomer is simply removed from container in which it has been immersed in the liquid precursor or, in an alternative, the liquid precursor is simply drained from such container. In any event, the condensation reaction promoter is applied, usually directly, to the swelled elastomer, usually to its outer surface, and is allowed to disperse via the absorbed precursor within the swelled elastomer and to thereby to promote the condensation reaction of the filler precursor from within the elastomer host and cause the in-situ creation, or formation, of the filler dispersion. The optional organosilane is subsequently added to the swelled elastomer before the completion of the condensation reaction. It may be envisioned, for example, that the elastomer host may be cut into individual segments, the segments immersed and mixed, for example by stirring, in a suitable container with a liquid filler pre-cursor and a resulting swelled elastomer removed from any remaining liquid filler precursor. The condensation promoter may then be applied to the swelled elastomer host fragments. The optional organosilane is subsequently added to the swelled elastomer before the completion of the condensation reaction.

In the practice of this invention, various acidic or basic condensation promoters may be used and, in general, are understood to be well known to those having skill in such art. For example, representative of basic promoters are, for example, ammonia, ammonium hydroxide, N-butylamine, terbutylamine, tetrahydrofuran (THF), sodium fluoride, various proteins linear polyamines such as, for example, pentaethylene hexamine, diaminopropane, diethylenetriamine, triethylenetetramine and polyallylamines such as, for example, poly(allylaminehydrochloride), poly(L-lysine hydrobromide), poly(L-arginine hydrochloride) and poly(L-histidine hydrochloride). For example, representative of acidic promoters are phosphoric acid, acetic acid, hydrofluoric acid and sulfuric acid.

Metal salts and metal oxides can also be used as promoters or inhibitors of silane condensation reactions (ie: Lewis acid or base reactions). Examples of metal salts are, for example zinc sulfate, aluminate sulfate, zinc stearate, and aluminum stearate. Examples of metal oxides are, for example, zinc oxide and aluminum oxide.

Typical catalysts for condensation reaction curing of silicon rubber might also be used. Examples are bis(2-ethylhexanoate) tin and bis(neodecanoate) tin.

The actual selection of condensation promoter will depend somewhat upon whether the elastomer might be provided in an organic solvent solution or as a latex and can readily be determined by one having skill in such art.

Thus, the condensation reaction may be controlled by an acid or a base promoter, depending somewhat upon the kinetics of filler formation required and the in-situ filler structure desired.

For example, while individual circumstances may vary, an acid or base condensation reaction promoter, or any other suitable condensation reaction promoter, may be applied sequentially to promote, first, the alkoxy silane hydrolysis (acidic promoter) and then, secondly, the silane condensation reaction (basic promoter) leading to the actual in-situ filler formation.

A particular advantage in using the aforesaid pre-formed elastomer which contains the in-situ formed filler in an elastomer composition is the reduction of mixing energy required from an elastomer-filler composite with optimum, homogeneous filler dispersion, namely a more homogeneous dispersion within the elastomer with less agglomeration of the individual filler particles together to form larger aggregates. This is desirable because it can both improve the processing of an elastomer composition during the mixing of the elastomer with other rubber compounding ingredients and, also various of the physical properties of the resulting rubber composition as well as various tire performances properties. Such improvements may be evidenced, for example in a reduction of a rubber composition's hysteresis and an improvement in a rubber composition's resistance to abrasion, apparently as a result of forming a more homogeneous dispersion of the in-situ formed filler and improvement in an efficiency of the interaction of the filler with the elastomer host which may be particularly significant for a tire tread rubber composition.

It is contemplated that the pre-formed rubber composite of this invention enables a more efficient, integral dispersion of the reinforcing filler and particularly the hydrophillic filler particles (eg: silica, aluminosilicate and titanium dioxide) into a rubber composition.

It is contemplated that the practice of this invention promotes better handling of desirable fillers, limit partial re-agglomeration of the in-situ formed particles, and thereby enable a better, more homogeneous dispersion thereof in the elastomer host and in the resulting rubber composition.

In the practice of this invention, it is contemplated that the pre-formed integral composite of diene-based elastomer reinforcing filler as an situ synthesized filler will reduce the agglomeration effect of the filler particles, and thereby promote a more homogeneous dispersion of the hydrophilic filler (eg: silica) in the rubber composition.

In one aspect of the invention, it is desired that the rubber composition of pre-formed elastomer composite and additional elastomer(s) is worked by (a) thermomechanically mixing the composite, in at least two sequential mixing steps, with conventional compounding ingredients, all in the absence of curatives (i) to a maximum temperature in a range of about 160° C. to about 180° C. and for a duration of time, upon reaching said maximum temperature, in a range of about 1 to about 10 minutes at a temperature within about 5° C. to about 10° C. of said maximum temperature or (ii) to a maximum temperature in a range of about 155° C. to about 165° C. and for a duration of time upon reaching said maximum temperature, in a range of about four to about twenty minutes at a temperature within about 5° C. to about 10° C. of said maximum temperature, followed by (b) a final thermomechanical mixing step in which sulfur curatives and cure accelerators are mixed with said mixture for about one to about four minutes to a temperature of about 90° C. to about 120° C.; whereas the rubber mixture is cooled to a temperature below about 40° C. between each of the aforesaid mixing stages.

Depending somewhat upon the rotor speed of the mixer, the fill factor and the rubber composition itself, the time to reach the maximum temperature may range from about 2 to about 5 minutes. The term "fill factor" is believed to be well known to those having skill in such art as the portion of the volume of the internal mixer occupied by the rubber composition itself. Other parameters being equal, a rubber composition having a higher oil content will usually take a longer time to reach the maximum temperature.

In practice, an internal rubber mixer is preferred for the individual mixing steps.

In the recited mixing process the term "curatives" in intended to refer to rubber vulcanization curatives in a conventional sense, meaning sulfur together with accompanying sulfur vulcanization accelerators or perhaps, although not preferred, peroxide curatives might be used.

Classical rubber-reinforcing carbon blacks considered for use in this invention, including carbon blacks used for preparation of the carbon black composite, are, for example, carbon blacks having an Iodine Adsorption Number (ASTM test D1510) in a range of about 30 to about 180 and sometimes even up to about 250 g/kg and a DBP (dibutylphthalate) Adsorption Number (ASTM test D2414) in a range of about 20 to about 150 $cm^3$/100 g. Representative examples of such carbon blacks, and references to associated ASTM test methods, may be found, for example, in *The Vanderbilt Rubber Handbook,* 1990 edition on pages 416 to 418.

The resultant physical properties obtained for rubber compositions of this will depend somewhat upon the carbon black composite used, the coupler used and the rubber composition itself.

The rubber composite itself can also be provided as being a sulfur cured composition through vulcanization of the uncured elastomer composition. The sulfur curing is accomplished in a conventional manner, namely, by curing under conditions of elevated temperature and pressure for a suitable period of time.

The curatives for sulfur curing the rubber composition are curatives conventionally used for sulfur curable elastomers which typically include sulfur and one or more appropriate cure accelerators and sometimes also a retarder. Such curatives and use thereof for sulfur curable elastomer compositions are well known to those skilled in the art.

Sequential mixing processes for preparing sulfur curable rubber compositions in which elastomers and associated ingredients exclusive of curatives are first mixed in one or more sequential steps, usually called a "non-productive mixing step(s)" followed by a final mixing step for adding curatives, usually called a "productive mixing step", are also well known to those skilled in the art.

In the practice of this invention, additional diene-based elastomers can be blended with the aforesaid elastomer composition such as homopolymers and copolymers of conjugated dienes and copolymers of conjugated diene(s) and vinyl aromatic compound. Such dienes may, for example, be selected from isoprene and 1,3-butadiene and such vinyl aromatic compounds may be selected from styrene and alpha-methylstyrene. Such elastomer, or rubber, may be selected, for example, from at least one of cis 1,4-polyisoprene rubber (natural and/or synthetic, and preferably natural rubber), 3,4-polyisoprene rubber, styrene/butadiene copolymer rubbers, isoprene/butadiene copolymer rubbers, styrene/isoprene copolymer rubbers, styrene/isoprene/butadiene terpolymer rubbers, cis 1,4-polybutadiene rubber, trans 1,4-polybutadiene rubber (70–95 percent trans), low vinyl polybutadiene rubber (10–30 percent vinyl), high vinyl polybutadiene rubber having from about 35 to about 90 percent vinyl 1,2-content and emulsion polymerization prepared butadiene/acrylonitrile copolymers.

It is to be appreciated that additional silica, particularly precipitated silica, and/or carbon black might also be blended with the said composite of preformed reinforced elastomer and additional elastomer(s).

It is intended for the practice of this invention that the term "precipitated silica", when used herein, also includes precipitated aluminosilicates as a form of precipitated silica. The precipitated silicas are, for example, those obtained by the acidification of a soluble silicate, e.g., sodium silicate, generally exclusive of silica gels.

Such silicas might be characterized, for example, by having a BET surface area, as measured using nitrogen gas, preferably in the range of about 40 to about 600, and more usually in a range of about 50 to about 300 square meters per gram ($m^2/g$). The BET method of measuring surface area is described by Brunauer, Emmett and Teller: *Journal of American Chemical Society* (1938) page 309. An additional reference might be DIN Method 66131.

The silica may also be typically characterized by having a DBP (dibutylphthalate) Absorption Number in a range of about 100 to about 400, and more usually about 150 to about 300 cc/100 g.

Various commercially available precipitated silicas may be considered for use in this invention such as, only for example herein, and without limitation, silicas commercially available from PPG Industries under the Hi-Sil trademark with designations 210, 243, etc; silicas available from Rhone-Poulenc with, for example, designations of Zeosil 1165MP and silicas available from Degussa AG with, for example, designations VN2 and VN3, BV3380GR, etc. and from Huber as Zeopol 8745.

Various couplers may be used and many are well known to those skilled in such art. For example bis (trialkoxysilylalkyl) polysulfides may be used which contain from two to about eight sulfur atoms in their polysulfidic bridge, with an average of about 2 to about 5 sulfur atoms. For example, the polysulfidic bridge may contain an average of from about 2 to 3 or 3.5 to 5 sulfur atoms. The alkyl groups may be selected, for example, from methyl, ethyl, and propyl groups. Therefore, a representative coupler might be, for example, a bis(triethoxysilylpropyl) polysulfide containing from 2 to 8, with an average of about 2 to about 5, sulfur atoms in its polysulfidic bridge.

It is to be appreciated that the coupler, if in a liquid form, might be used in conjunction with a carbon black carrier, namely, pre-mixed with a carbon black prior to the addition to the rubber composition, and such carbon black is usually to be included in the amount of carbon black accounted for in the rubber composition formulation.

It is readily understood by those having skill in the art that the rubber composition would be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as oils, resins including tackifying resins, silicas, and plasticizers, fillers, pigments, fatty acid, zinc oxide, waxes, antioxidants and antiozonants, peptizing agents and reinforcing materials such as, for example, carbon black. As known to those skilled in the art, depending on the intended use of the sulfur vulcanizable and sulfur vulcanized material (rubbers), the additives mentioned above are selected and commonly used in conventional amounts.

In the preparation of the rubber composition typical amounts of tackifier resins, if used, comprise about 0.5 to about 10 phr, usually about 1 to about 5 phr. Typical amounts of processing aids comprise about 1 to about 50 phr. Such processing aids can include, for example, aromatic, napthenic, and/or paraffinic processing oils. Typical amounts of antioxidants comprise about 1 to about 5 phr. Representative antioxidants may be, for example, diphenyl-p-phenylenediamine and others such as, for example, those disclosed in *The Vanderbilt Rubber Handbook* (1978), pages 344–346. Typical amounts of antiozonants comprise about 1 to 5 phr.

Typical amounts of fatty acids, if used, which can include stearic acid, palmitic acid, linoleic acid or mixtures of one or more fatty acids, can comprise about 0.5 to about 5 phr.

Often stearic acid is used in a relatively impure state and is commonly referred to in the rubber compounding practice as "stearic acid" and is so referred to in the description and practice of this invention.

Typical amounts of zinc oxide comprise about 1 to about 5 phr. Typical amounts of waxes comprise about 1 to about 5 phr. Often microcrystalline waxes are used. Typical amounts of peptizers, if used, comprise about 0.1 to about 1 phr. Typical peptizers may be, for example, pentachlorothiophenol and dibenzamidodiphenyl disulfide.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to about 4 phr, or even, in some circumstances, up to about 8 phr, with a range of from about 1 to about 2.5, sometimes from about 1 to about 2, being preferred.

Accelerators are used to control the time and/or temperature required for vulcanization and to improve the properties of the vulcanizate. In one embodiment, a single accelerator system may be used, i.e., primary accelerator. Conventionally and preferably, a primary accelerator(s) is used in total amounts ranging from about 0.5 to about 4, preferably about 0.8 to about 2, phr. In another embodiment, combinations of a primary and a secondary accelerator might be used with the secondary accelerator being used in amounts of about 0.05 to about 3 phr in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The presence and relative amounts of the above ingredients, other than carbon black and coupler, are not considered to be the primary subject of this invention which is more primarily directed to the preparation and use of the aforesaid pre-formed elastomer composite with the integral silica dispersion.

The ingredients are typically mixed in at least two stages, namely, at least one non-productive stage followed by a productive mix stage. The final curatives are typically mixed in the final stage which is conventionally called the "productive" mix stage in which the mixing typically occurs at a temperature, or ultimate temperature, lower than the mix temperature(s) than the preceding non-productive mix stage (s). The rubber, carbon black and coupling agent if used, are mixed in one or more non-productive mix stages. The terms "non-productive" and "productive" mix stages are well known to those having skill in the rubber mixing art.

In at least one of the non-productive (NP) mixing stages, the materials are thermomechanically mixed and the mixing temperature is allowed to reach a temperature of, for example, between 140° C. and 190° C.

The rubber composition of this invention can be used for various purposes. For example, it can be used for various tire compounds. Such tires can be built, shaped, molded and cured by various methods which are known and will be readily apparent to those having skill in such art.

The invention may be better understood by reference to the following examples in which the parts and percentages are by weight unless otherwise indicated.

EXAMPLE I

In this Example, a pre-formed elastomer/filler composite is prepared by dissolving a butadiene/styrene copolymer elastomer in a hydrocarbon solvent, then adding a liquid filler precursor to the solution, and synthesizing a filler dispersion in-situ within the elastomer host via a condensation reaction.

It is to be appreciated that this Example is intended to be somewhat representative of an elastomer cement obtained by copolymerizing styrene and 1,3-butadiene in an organic solvent since, in practice, it would usually be more preferable to utilize an elastomer cement rather than to re-dissolve an elastomer in an organic solvent.

For one experimental portion of this Example, an organosilane is added to the mixture prior to completion of the condensation reaction.

By this method, the resulting in-situ formed filler is in a form of an integral dispersion within the host elastomer.

The samples of elastomer/filler composites are identified herein as Samples A (recited as a Control for the purposes of this Example), B and C.

For this Example, the elastomer used for Samples A and B is prepared by copolymerizing styrene and 1,3-butadiene in an organic solvent solution in a presence of a lithium based catalyst and recovering the elastomer. The elastomer may be referred to in this Example as an "S-SBR" having a bound styrene content of about 18 percent.

For this Example, the elastomer used for Sample C is similar to the elastomer used for Samples A and B except that the co-polymerization of the 1,3-butadiene and styrene is quenched with bis(triethoxysilylpropyl) disulfide (containing an average of about 2.2 sulfur atoms in its polysulfidic bridge) leading to a triethoxysilylpropyl mono sulfane end terminated styrene/butadiene copolymer elastomer having a bound styrene content of about 18 percent. Such elastomer may be referred to in this Example as an "ST-SBR".

The experimentation was conducted by first dissolving the S-SBR, or ST-SBR as the case may be, in a hexane solvent. Liquid tetraethoxysilane (TEOS), as a filler precursor, is then added to the elastomer solution, in a weight ratio of about ½ of TEOS to elastomer and water is then added (weight ratio of water to TEOS is about 2/1), together with a 1,3-diaminopropane condensation reaction promoter (promoter is about 2 weight percent of the entire mixture including the water).

The condensation reaction is allowed to proceed at about room temperature, or about 25° C., while stirring the mixture.

For Samples B and C, prior to completion of the condensation reaction of the TEOS, a bis (3-triethoxysilylpropyl) disulfide (containing an average of about 2.2 sulfur atoms in its polysulfidic bridge) is added to the reaction system. The reaction is allowed to proceed for about one hour at about 25° C. while stirring the mixture.

The resulting Samples A, B and C are recovered by drying at about 80° C. for about three hours in an open air oven.

The content of the in-situ formed silica filler dispersion of the elastomer/filler composite may be determined by thermogravimetric analysis. The in-situ formed silica particles are contemplated as being substantially spherical in shape with a diameters ranging from about 5 to about 300 nm, with some dendrite expansion, as may be determined by transmission electron microscopy.

A summary of Samples A (the Control), B and C is shown in the following Table 1:

TABLE 1

| Materials | A (Control) | Sample B | Sample C |
|---|---|---|---|
| 1) Elastomer | S-SBR | S-SBR | ST-SBR |
| 2) Filler precursor | TEOS | TEOS | TEOS |
| 3) Disulfide addition | No | Yes | Yes |
| 4) In-situ formed silica filler (wt %) | 18 | 20 | 25 |

While physical properties of a rubber composition such as modulus and elongation are usually measured for a sulfur cured rubber composition, it was decided to measure such values for the unvulcanized Samples A, B and C, particularly since the in-situ formed filler dispersion with the elastomer hosts appeared to form an elastomer/filler composite with sufficient dimensional stability for such properties to be determined as represented in the following Table 1A:

TABLE 1A

| Properties | Sample A | Sample B | Sample C |
|---|---|---|---|
| 1) Modulus (300%), MPa | 1.1 | 1.5 | 2.3 |
| 2) Elongation (%) | 700 | 620 | 575 |

It is important to appreciate that the modulus and elongation values measured for Sample A demonstrate an actual reinforcement potential, or effect, of the in-situ synthesized filler within the elastomer host because without the in-situ synthesized filler one having skill in such art would expect the modulus value to be much smaller and elongation value to be much larger for the elastomer.

The higher modulus and lower elongation properties reported for Sample B in Table 1A indicate that a greater reinforcement of the elastomer host is obtained in forming an elastomer/filler composite by combining the use of the TEOS filler precursor with the subsequent addition of the organosilane disulfide material prior the completion of the condensation reaction instead of utilizing the TEOS alone as in Sample A.

The still higher modulus and lower elongation properties reported for Sample C in Table 1A indicate that an even greater reinforcement of the elastomer is obtained in forming an elastomer/filler composite by combining the use of an alkoxy metal end functionalized elastomer together with the TEOS filler precursor and subsequent addition of the organosilane disulfide material prior the completion of the condensation reaction as compared to utilizing the TEOS alone with a more conventional elastomer host as in Sample A and as compared to using the TEOS together with the organosilane disulfide addition with a more conventional elastomer host as in Sample B.

The indicated higher reinforcement for Samples B and C is also considered herein be particularly advantageous for preparation of a pre-formed elastomer/filler composite which may be then be mixed with other elastomers, and optionally additional reinforcing fillers, for preparation of an elastomer composition for use in the preparation of various products, including, for example, components of tires.

EXAMPLE II

In this illustrative, contemplated, Example, an elastomer/filler composite is prepared by dry blending a butadiene/styrene copolymer elastomer with a liquid filler precursor, namely tetraethoxysilane, or TEOS, and synthesizing a filler dispersion in-situ within the elastomer host via a condensation reaction.

For the purposes of this Example, the elastomer and liquid filler precursor are blended and the filler precurser allowed to proceed with a condensation reactio, in a dual shaft extruder.

In this manner, an elastomer/filler composite is prepared with the in-situ formed filler being in a form of an integral dispersion within the host elastomer.

The samples of elastomer/filler composites are identified herein as Samples D (a Control for the purposes of this Example), E and F.

The elastomer used for Samples D (Control) and E is prepared by copolymerizing styrene and 1,3-butadiene in an organic solvent solution in a presence of a lithium based catalyst and recovering the elastomer. The elastomer may be referred to in this Example as an "S-SBR" having a bound styrene content of about 18 percent.

The elastomer used for Sample F is similar to the elastomer used for Samples D and E except that the co-polymerization of the 1,3-butadiene and styrene is quenched with bis(triethoxysilylpropyl) disulfide (containing an average of about 2.2 sulfur atoms in its polysulfidic bridge) leading to a triethoxysilylpropyl mono sulfane end terminated styrene/butadiene elastomer having a bound styrene content of about 18 percent. Such elastomer may be referred to in this Example as an "ST-SBR".

For this Example, the elastomer/filler composite is prepared by first introducing the S-SBR, or ST-SBR as the case may be, into the extruder followed by adding TEOS in a weight ratio of about ½ of TEOS to elastomer together with a pentaethylenehexamine condensation reaction promoter (promoter is about 3.5 weight percent of the entire mixture.

The twin shaft extruder is operated at a temperature of about 170° C. with an overall residence mixing time for the ingredients within the extruder of about 10 minutes. The non-productive rubber ingredients, including the elastomer, are added to the extruder barrel and the filler precursor and condensation reaction promoter are added to the extruder at a location equivalent to about 25 percent of the overall residence time.

For Samples E and F, prior to completion of the condensation reaction of the TEOS, an organosilane in the form of a bis (3-triethoxysilylpropyl) disulfide material (containing an average of about 2.2 sulfur atoms in its polysulfidic bridge) is added to extruder at a location equivalent to about 50 percent of the overall residence time.

The in-situ formed silica particles are contemplated as being substantially spherical in shape with a diameters ranging from about 5 to about 300 nm, with some dendritic expansion as may be determined by transmission electron microscopy.

A contemplated summary and proposed in-situ formed silica filler contents of Samples D (the Control), E and F is shown in the following Table 2:

TABLE 2

| Materials | D (Control) | Sample E | Sample F |
|---|---|---|---|
| 1) Elastomer | S-SBR | S-SBR | ST-SBR |
| 2) Filler precursor | TEOS | TEOS | TEOS |
| 3) Disulfide addition | No | Yes | Yes |
| 4) In-situ formed silica filler (wt %) | 16 | 20 | 28 |

EXAMPLE III

In this Example, an elastomer/filler composite is prepared by dry blending a butadiene/styrene copolymer elastomer with a liquid filler precursor, namely tetraethoxysilane, or TEOS, and synthesizing a filler dispersion in-situ within the elastomer host via a condensation reaction.

For the purposes of this Example, the elastomer and liquid filler precursor are blended in an internal, Banbury type, rubber mixer.

In this manner, the elastomer/filler composite is prepared with an in-situ formed filler as an integral dispersion within the host elastomer.

The samples of elastomer/filler composites are identified herein as Samples G (a Control for the purposes of this Example), H and I.

The elastomer used for Samples G (Control) and H is prepared by copolymerizing styrene and 1,3-butadiene in an organic solvent solution in a presence of a lithium based catalyst and recovering the elastomer. The elastomer may be referred to in this Example as an "S-SBR" having a bound styrene content of about 18 percent.

The elastomer used for Sample I is similar to the elastomer used for Samples G and H except that the co-polymerization of the 1,3-butadiene and styrene is quinched with bis(triethoxysilylpropyl) disulfide (containing an average of about 2.2 sulfur atoms in its polysulfidic bridge) leading to a triethoxysilylpropyl mono sulfane end terminated styrene/butadiene elastomer having a bound styrene content of about 18 percent. Such elastomer may be referred to in this Example as an "ST-SBR".

For this Example, the elastomer/filler composite is prepared by first introducing the S-SBR, or ST-SBR as the case may be, into the internal rubber mixer followed by adding TEOS in a weight ratio of about ½ of TEOS to elastomer together with a pentaethylenehexamine condensation reaction promoter (promoter is about 3.5 weight percent of the entire mixture.

The mixture is mixed in the rubber mixer for about 8 minutes to a temperature of about 170° C.

For Samples H and I, prior to completion of the condensation reaction of the TEOS, an organosilane in the form of a bis (3-triethoxysilylpropyl) disulfide material (containing an average of about 2.2 sulfur atoms in its polysulfidic bridge) is added to the Banbury type mixer after about 6 minutes of the above referenced 8 minute mixing time.

The in-situ formed silica particles are contemplated as being substantially spherical in shape with a diameters ranging from about 5 to about 300 nm, with some dendritic expansion as may be determined by transmission electron microscopy.

A summary of Samples G (the Control), H and I is shown in the following Table 3:

TABLE 3

| Materials | G (Control) | Sample H | Sample I |
| --- | --- | --- | --- |
| 1) Elastomer | S-SBR | S-SBR | ST-SBR |
| 2) Filler precursor | TEOS | TEOS | TEOS |
| 3) Disulfide addition | No | Yes | Yes |
| 4) In-situ formed silica filler (wt %) | 16 | 20 | 28 |

While physical properties of a rubber composition, such as modulus and elongation are usually measured for a sulfur cured rubber composition, it was decided to measure such values for the unvulcanized Samples G, H and I, particularly since the in-situ formed filler dispersion with the elastomer hosts appeared to form an elastomer/filler composite with sufficient dimensional stability for such properties to be determined as represented in the following Table 3A:

TABLE 3A

| Properties | Sample G | Sample H | Sample I |
| --- | --- | --- | --- |
| 1) Modulus (300%), MPa | 1 | 1.6 | 2.2 |
| 2) Elongation (%) | 750 | 610 | 600 |

It is important to appreciate that the modulus and elongation values measured for Sample G demonstrate an actual reinforcement potential, or effect, of the in-situ synthesized filler within the elastomer host because without the in-situ synthesized filler one having skill in such art would expect the modulus value to be much smaller and elongation value to be much larger for the elastomer.

The higher modulus and lower elongation properties reported for Sample H in Table 3A indicate that a greater reinforcement of the elastomer host is obtained in forming an elastomer/filler composite by combining the use of the TEOS filler precursor with the subsequent addition of the organosilane disulfide material prior the completion of the condensation reaction instead of utilizing the TEOS alone as in Sample G.

The still higher modulus and lower elongation properties reported for Sample I in Table 3A indicate that an even greater reinforcement of the elastomer is obtained in forming an elastomer/filler composite by combining the use of an alkoxy metal end functionalized elastomer together with the TEOS filler precursor and subsequent addition of the organosilane disulfide material prior the completion of the condensation reaction as compared to utilizing the TEOS alone with a more conventional elastomer host as in Sample G and as compared to using the TEOS together with the organosilane disulfide addition with a more conventional elastomer host as in Sample H.

The indicated higher reinforcement for Samples H and I is also considered herein be particularly advantageous for preparation of a pre-formed elastomer/filler composite which may be then be mixed with other elastomers, and optionally additional reinforcing fillers, for preparation of an elastomer composition for use in the preparation of various products, including, for example, components of tires.

EXAMPLE IV

In this illustrative, contemplated, Example, an elastomer/filler composite is prepared by immersing a butadiene/styrene copolymer elastomer within a liquid filler precursor, namely tetraethoxysilane, or TEOS, allowing the liquid precursor to imbibe into the elastomer itself and synthesizing a filler dispersion in-situ within the elastomer host via a condensation reaction.

In this manner, the in-situ formed filler is a form of an integral dispersion within the host elastomer. The samples of elastomer/filler composites are identified herein as Samples J (a Control for the purposes of this Example), K and L.

The elastomer used for Samples J (Control) and K is prepared by copolymerizing styrene and 1,3-butadiene in an organic solvent solution in a presence of a lithium based catalyst and recovering the elastomer. The elastomer may be referred to in this Example as an "S-SBR" having a bound styrene content of about 18 percent.

The elastomer used for Sample L is similar to the elastomer used for Samples J and K except that the co-polymerization of the 1,3-butadiene and styrene is quenched with bis(triethoxysilylpropyl) disulfide (containing an average of about 2.2 sulfur atoms in its polysulfidic bridge) leading to a triethoxysilylpropyl mono sulfane end terminated styrene/butadiene copolymer elastomer having a bound styrene of about 18 percent. Such elastomer may be referred to in this Example as an "ST-SBR".

For this Example, the elastomer/filler composite is prepared by first, in a suitable container, immersing the S-SBR, or ST-SBR as the case may be, into the liquid filler precursor (the TEOS) at a temperature of about 25° C. for about one hour to allow the TEOS to soak, or imbibe, into the elastomer, thereby forming a swelled elastomer. An n-butylamine condensation reaction promoter is applied to the swelled elastomer. The condensation reaction promoter is used in an amount of about 3 weight percent of the elastomer and TEOS in the swelled elastomer.

For Samples J and K, prior to completion of the condensation reaction of the TEOS, an organosilane in a form of a bis (3-triethoxysilylpropyl) disulfide material (containing an average of about 2.2 sulfur atoms in its polysulfidic bridge) is applied to the TEOS-containing swelled elastomer.

The in-situ formed silica particles are contemplated as being substantially spherical in shape with diameters ranging from about 5 to about 300 nm, with some dendritic expansion, as may be determined by transmission electron microscopy.

A contemplated summary and proposed silica content of Samples J (the Control), K and L is shown in the following Table 4:

TABLE 4

| Materials | J (Control) | Sample K | Sample L |
|---|---|---|---|
| 1) Elastomer | S-SBR | S-SBR | ST-SBR |
| 2) Filler precursor | TEOS | TEOS | TEOS |
| 3) Disulfide addition | No | Yes | Yes |
| 4) In-situ formed silica filler (wt %) | 15 | 19 | 24 |

EXAMPLE V

For this Example, illustrative samples of elastomer compositions are contemplated as being prepared using the pre-formed elastomer/filler composites of Examples I, II, III and VI.

The samples prepared are reported herein as Samples 1–16, with Samples 1, 2, 5, 6, 9, 10, 13 and 14 being in a nature of control Samples for the purpose of this Example.

Control Samples 1, 5, 9, and 13 are prepared by blending, in a first mixing stage in an internal rubber mixer, precipitated silica and a bis(3-triethoxysilylpropyl) disulfide compound, as a coupling agent having an average of about 2.2 sulfur atoms in its polysulfidic bridge, with a rubber composition of a styrene/butadiene rubber and other rubber compounding ingredients exclusive of free sulfur, in at least one preparatory, (non-productive), mixing stage. In a subsequent mixing stage, free sulfur and accelerator(s) are mixed with the rubber composition.

Control Samples 2, 6 and 10 are similarly prepared as a second Control except that the preformed elastomer composites of Examples I–IV are added in an aforesaid preliminary, non-productive mixing stage.

Samples 3, 4, 7, 8, 11, 12, 15 and 16 are similarly prepared as Sample 1 except that the preformed elastomer/filler composites, other than the Control pre-formed composites, of Examples I–IV are blended with the rubber composition in said preparatory (non-productive) mixing stage(s). Accordingly, the amount of precipitated silica is adjusted, as is the addition of the organosilane disulfide.

In particular, rubber compositions containing the materials referenced in Tables 1–4 are prepared in a BR Banbury mixer using three separate stages of addition (mixing), namely, two preparatory mix stages and one final mix stage to temperatures of 170° C., 160° C. and 120° C. and times of about 8 minutes, two minutes and two minutes, respectively for the three overall mix stages. After each mixing step, the rubber mixture is batched off on a two roll mill, mill mixed for a short period of time, and slabs, or sheets, of rubber removed from the mill and allowed to cool to a temperature of about 30° C. or lower.

The amounts of pre-formed elastomer/filler composite, S-SBR, ST-SBR, precipitated silica, and organosilane disulfide are listed as being "variable" in the following Table 5.

TABLE 5

| | Parts |
|---|---|
| Non-Productive Mix Stages | |
| Pre-formed elastomer/filler composite[1] | Variable |
| Styrene/butadiene rubber[2] | Variable |
| Cis 1,4-polybutadiene[3] | 30 |
| Oil[4] | 25 |
| Fatty Acid[5] | 2 |
| Silica[6] | Variable |
| Organosilane Disulfide[7] | Variable |
| Productive Mix Stage | |
| Sulfur[8] | 1.4 |
| Zinc Oxide | 2.5 |
| Antioxidant(s)[9] | 3 |
| Sulfenamide & Guanidine Type Accelerators | 4 |
| Organosilane Polysulfide(B)[10] | 2 |

1) Pre-formed elastomer/filler composites prepared, variously, in Examples I, II, III and IV.

2) Solution polymerization prepared styrene/butadiene copolymer rubber obtained from The Goodyear Tire & Rubber Company containing about 18 percent styrene and having a Tg of about −70° C.

3) Cis 1,4-polybutadiene elastomer obtained as BUDENE® 1207 from The Goodyear Tire & Rubber Company.

4) Oil.

5) Fatty acid, primarily stearic acid.

6) Zeosil 1165 MP from Rhone Poulenc.

7) A composite commercially available from Degussa GmbH as X266S in a form of a 50/50 blend, or composite, of Si266 (trademark of Degussa) and carbon black. The Si266 is a bis-(3-triethoxysilylpropyl) disulfide compound (I) understood to have an average of about 2.2 sulfur atoms in its polysulfidic bridge. Thus, the composite contains 50 percent of the organosilane disulfide compound.

8) Obtainable as an S8 elemental sulfur from the Kali Chemie company of Germany.

9) A phenylene diamine type.

10) A composite commercially available from Degussa GmbH as X50S in a form of a 50/50 blend of Si69, a trademark of Degussa GmbH, or what might be referred to as bis-(3-triethoxysilylpropyl)tetrasulfide compound (II) having an average of about 3.8 sulfur atoms in its polysulfide bridge, with carbon black and, thus, the organosilane tetrasulfide is considered as being 50% of the composite and, therefore, 50% active.

The Samples are molded in a suitable mold and cured, or vulcanized, for about 16 minutes to a temperature of about 160° C.

A summary of the variable additions of materials for Samples 1–4 is shown in the following Table 6.

TABLE 6

Non-Productive Mixing

| | Sample # | | | |
|---|---|---|---|---|
| | 1 Cntrl | 2 Cntrl | 3 | 4 |
| Pre-formed composite (A) | — | 80.5 | | |
| Pre-formed composite (B) | — | | 80.5 | |
| Pre-formed composite (C) | — | — | | 80.5 |
| Styrene-butadiene rubber | 70 | | | |
| Precipitated silica | 75 | 50 | 50 | 40 |
| Organosilane disulfide | 12 | 12 | 10 | 6 |

A summary of the variable additions of materials for Samples 5–8 is shown in the following Table 7.

TABLE 7

Non-Productive Mixing

| | Sample # | | | |
|---|---|---|---|---|
| | 5 Cntrl | 6 Cntrl | 7 | 8 |
| Pre-formed composite (D) | — | 80.5 | | |
| Pre-formed composite (E) | — | | 80.5 | |
| Pre-formed composite (F) | — | — | | 80.5 |
| Styrene-butadiene rubber | 70 | | | |
| Precipitated silica | 75 | 50 | 50 | 40 |
| Organosilane disulfide | 12 | 12 | 10 | 6 |

A summary of the variable additions of materials for Samples 9–12 is shown in the following Table 8.

TABLE 8

Non-Productive Mixing

| | Sample # | | | |
|---|---|---|---|---|
| | 9 Cntrl | 10 Cntrl | 11 | 12 |
| Pre-formed composite (G) | — | 80.5 | | |
| Pre-formed composite (H) | — | | 80.5 | |
| Pre-formed composite (I) | — | — | | 80.5 |
| Styrene-butadiene rubber | 70 | | | |
| Precipitated silica | 75 | 50 | 50 | 40 |
| Organosilane disulfide | 12 | 12 | 10 | 6 |

A summary of the variable additions of materials for Samples 13–16 is shown in the following Table 9.

TABLE 9

Non-Productive Mixing

| | Sample # | | | |
|---|---|---|---|---|
| | 13 Cntrl | 14 Cntrl | 15 | 16 |
| Pre-formed composite (J) | — | 80.5 | | |
| Pre-formed composite (K) | — | | 80.5 | |
| Pre-formed composite (L) | — | — | | 80.5 |
| Styrene-butadiene rubber | 70 | | | |
| Precipitated silica | 75 | 50 | 50 | 40 |
| Organosilane disulfide | 12 | 12 | 10 | 6 |

For the rubber compositions illustrated in Tables 6–9, it is important to appreciate that Samples 1, 5, 9 and 14 utilized precipitated silica reinforcement without a pre-formed elastomer/filler composite of this invention. Accordingly, 12 parts of the organosilane disulfide is added to the elastomer mixture to accommodate the added precipitated silica as a coupling agent (as earlier indicated in this Example, the organosilane disulfide material is used as a 50/50 composite of the liquid disulfide and carbon black as a carrier and, thus, the actual amount of the organosilane disulfide is 6 phr).

It is also important to appreciate that for Samples 2, 6, 10 and 14 where a pre-formed elastomer/filler composite prepared with TEOS filler precursor is used, but without any addition of organosilane material to the condensation reaction for the preparation of the pre-formed elastomer/filler composite, a reduced amount of precipitated silica is utilized but a same amount of attendant organosilane disulfide is added to the elastomer mixture as for Samples 1, 5, 9 and 14. In this manner, then, a more efficient method of introducing a homogeneously dispersed particulate reinforcement in a rubber composite considered herein as being provided.

It is to be further appreciated that, for Samples 3, 7, 11, and 15, where a pre-formed elastomer/filler composite of this invention, prepared with TEOS filler precursor together with addition of organosilane material to the condensation reaction is used, a reduced amount of precipitated silica is added but same amount of attendant organosilane disulfide is added to the elastomer mixture. In this manner, then, another more efficient method of introducing a homogeneously dispersed particulate reinforcement in a rubber composite considered herein as being provided.

It is to be additionally appreciated that, for Samples 4, 8, 12, and 16, where a pre-formed elastomer/filler composite of this invention, prepared with an alkoxy metal end functionalized elastomer, TEOS filler precursor together with addition of organosilane material to the condensation reaction is used, a reduced amount of both precipitated silica and attendant organosilane disulfide are added to the elastomer mixture. Indeed, the reduced amount of added organosilane disulfide is utilized primarily to accommodate the added precipitated silica. In this manner, then, an additional other more efficient method of introducing a homogeneously dispersed particulate reinforcement in a rubber composite considered herein as being provided.

A significance of the presentation of these Samples is to demonstrate the preparation of rubber compositions with considerably more efficient reinforcing filler introduction, as a homogeneous dispersion, to the rubber composition via the use of a pre-formed elastomer/composite prepared according to this invention.

EXAMPLE VI

Tires of size 195/65R15 are contemplated as being prepared which individually use the rubber compositions of Samples 1–16 for their treads.

While certain representative embodiments and details have been shown for the purpose of illustrating the invention, it will be apparent to those skilled in this art that various changes and modifications may be made therein without departing from the spirit or scope of the invention.

What is claimed is:

1. A method of preparing an elastomer/filler composite as a dispersion of a filler formed in-situ within an elastomer host which comprises blending, in an internal mixer, a filler precursor, condensation reaction promoter and elastomer host selected from at least one of the group consisting of elastomer host (A) and elastomer host (B), to initiate a condensation reaction of said filler precursor and, for elastomer host (A), and optionally for elastomer host (B), subsequently adding and reacting, in an internal mixer, an organosilane material with said filler/filler precursor prior to the completion of said condensation reaction; followed by recovering the resulting elastomer/filler composite;

wherein said elastomer host (A) is selected from at least one of the group consisting of homopolymers of conjugated dienes, copolymers of conjugated dienes and copolymers of conjugated diene with a vinyl aromatic compound selected from styrene and alphamethyl styrene; wherein said elastomer host (B) is selected from at least one alkoxy metal end functionalized diene-based elastomer wherein said metal is selected from silicon, titanium, aluminum or boron, and wherein said elastomer is selected from at least one of the group consisting of homopolymers of conjugated dienes, copolymers of conjugated dienes and copolymers of conjugated diene with a vinyl aromatic compound selected from styrene and alpha-methylstyrene;

wherein said filler precursor is at least one material selected from the formulas (IIA), (IIB) and (IIC):

(IIA)

(IIB)

(IIC)

wherein M and M' are the same or different and are selected from silicon, titanium, zirconium, boron and aluminum, where R and R' are alkyl radicals individually selected from methyl, ethyl, n-propyl, isopropyl, n-butyl and isobutyl radicals, wherein x and w are individually equal to at least two, and wherein the sum of the integers x+y and w+z depend upon the valence of the associated M or M' as the case may be, whereby for formula (IIA) the sum of the integers x+y is therefore equal to 4 except when its associated M or M' is boron or aluminum for which it is 3; and wherein r is from 1 to 15;

wherein said organosilane is at least one material selected from formula (III), (IV) and (V), namely:

an organosilane polysulfide of Formula (III) as:

(III)

wherein m is a number in a range of from 2 to about 8 and the average for m is in a range of (a) about 2 to about 2.6 or (b) about 3.5 to about 4.5;

wherein Z is represented by the following formulas:

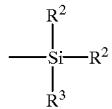

(Z1)

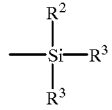

(Z2)

and

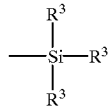

(Z3)

wherein $R^2$ is the same or different radical and is individually selected from alkyl radicals having 1 to 4 carbon atoms and phenyl radical; $R^3$ is the same or different alkoxy groups wherein the alkyl radicals of the alkoxy group(s) are alkyl radicals selected from methyl, ethyl, n-propyl, isopropyl, n-butyl and isobutyl radicals; and $R^1$ is a radical selected from the group consisting of a substituted or unsubstituted alkyl radicals having a total of 1 to 18 carbon atoms and a substituted or unsubstituted aryl radical having a total of 6 to 12 carbon atoms;

an alkyl alkoxy silane of Formula (IV) as:

(IV)

where $R^4$ may be the same or different alkyl radical selected from methyl, ethyl, n-propyl and isopropyl radicals and $R^5$ is selected from alkyl radicals having from 1 to 18 carbon atoms and aryl radicals or alkyl substituted aryl radicals having from 6 to 12 carbon atoms; and a functional organosilane of Formula (V) as:

(V)

wherein $R^6$ is the same or different alkyl radicals selected from methyl, ethyl, n-propyl and isopropyl radicals, y is an integer of from 1 to 12, and Y is selected from primary amino, mercapto, epoxide, thiocyanato, vinyl, methacrylate, ureido, isocyanato and ethylene diamine radicals.

2. The method of claim 1 wherein said internal mixer is at least one internal batch mixer.

3. The method of claim 1 wherein said internal mixer is a continuous internal extruder mixer.

4. The method of claim 1 wherein said elastomer is at least one elastomer (A).

5. The method of claim 1 wherein said elastomer is at least one elastomer (B) and wherein elastomer (B) has a general formula (I) of:

(I)

wherein X is selected from silicon, titanium, aluminum or boron, R is selected from at least one of the group consisting of methyl, ethyl, n-propyl, isopropyl, n-butyl and isobutyl radicals, and n is 3 for silicon and titanium and is 2 for aluminum and boron, and wherein said elastomer is selected from at least one of the group consisting of homopolymers of conjugated dienes, copolymers of conjugated dienes, and copolymers of at least one conjugated diene with a vinyl aromatic compound, selected from styrene and alpha-methylstyrene.

6. The method of claim 5 wherein, for elastomer (B), X is silicon, R is an ethyl radical, n is 3 and, for said elastomer (B), said vinyl aromatic compound is styrene.

7. The method of claim 4 wherein said elastomer (A) is selected from at least one of homopolymers and copolymers of 1,3-butadiene and isoprene, copolymers of styrene with at least one of 1,3-butadiene and isoprene styrene, tin coupled polymers and copolymers of 1,3-butadiene and isoprene and tin coupled copolymers of styrene with at least one of 1,3-butadiene and isoprene, and mixtures thereof.

8. The method of claim 5 wherein said elastomer (B) is selected from at least one of homopolymers and is copolymers of 1,3-butadiene and isoprene and copolymers of 1,3-butadiene and/or isoprene with styrene and where said end functionalization is an alkoxysilane wherein the alkyl radicals of said alkoxysilane are selected from at least one of ethyl, methyl, n-propyl and isopropyl radicals and mixtures thereof.

9. The method of claim 1 wherein said filler precursor is precursor (IIA).

10. The method of claim 9 wherein, for said filler precursor (IIA), M and M' are silicon, R is an ethyl radical, R' is a methyl radical and the sum of x+y is 4.

11. The method of claim 10 wherein said filler precursor is selected from at least one of tetraethoxy ortho silicate, titanium ethoxide, titanium n-propoxide, aluminum tri-sec butoxide, zirconium t-butoxide, zirconium n-butoxide, tetra-n-propoxy zirconium and boron ethoxide, methyl triethoxy silicate and dimethyl diethoxy silicate.

12. The method of claim 4 wherein said filler precursor is precursor (IIA).

13. The method of claim 12 wherein, for said filler precursor (IIA), M and M' are silicon, R is an ethyl radical, R' is a methyl radical and the sum of x+y is 4.

14. The method of claim 12 wherein said filler precursor is selected from at least one of tetraethoxy ortho silicate, titanium ethoxide, titanium n-propoxide, aluminum tri-sec butoxide, zirconium t-butoxide, zirconium n-butoxide, tetra-n-propoxy zirconium and boron ethoxide, methyl triethoxy silicate and dimethyl diethoxy silicate.

15. The method of claim 5 wherein said filler precursor is precursor (IIA).

16. The method of claim 15 wherein, for said filler precursor (IIA), M and M' are silicon, R is an ethyl radical, R' is a methyl radical and the sum of x+y is 4.

17. The method of claim 15 wherein said filler precursor is selected from at least one of tetraethoxy ortho silicate, titanium ethoxide, titanium n-propoxide, aluminum tri-sec butoxide, zirconium t-butoxide, zirconium n-butoxide, tetra-n-propoxy zirconium and boron ethoxide, methyl triethoxy silicate and dimethyl diethoxy silicate.

18. The method of claim 6 wherein said filler precursor is precursor (IIA).

19. The method of claim 18 wherein, for said filler precursor (IIA), M and M' are silicon, R is an ethyl radical, R' is a methyl radical and the sum of x+y is 4.

20. The method of claim 18 wherein said filler precursor is selected from at least one of tetraethoxy ortho silicate, titanium ethoxide, titanium n-propoxide, aluminum tri-sec butoxide, zirconium t-butoxide, zirconium n-butoxide, tetra-n-propoxy zirconium and boron ethoxide, methyl triethoxy silicate and dimethyl diethoxy silicate.

21. The method of claim 7 where said filler precursor is precursor (IIA) and wherein M and M' are silicon, R is an ethyl radical, R' is a methyl radical and the sum of x+y is 4.

22. The method of claim 8 where said filler precursor is precursor (IIA) and wherein M and M' are silicon, R is an ethyl radical, R' is a methyl radical and the sum of x+y is 4.

23. The method of 1 wherein said filler precursor is precursor (IIB).

24. The method of claim 23 wherein, for said filler precursor (IIB), M and M' are silicon, R is an ethyl radical, R' is a methyl radical and the sum of each of x+y and w+z is 3.

25. The method of claim 23 wherein said precursor (IIB) is selected from at least one of di-s-butoxyaluminoxy tri-ethoxysilane and hexaethoxydisiloxane.

26. The method of 4 wherein said filler precursor is precursor (IIB).

27. The method of claim 26 wherein, for said filler precursor (IIB), M and M' are silicon, R is an ethyl radical, R' is a methyl radical and the sum of each of x+y and w+z is 3.

28. The method of claim 26 wherein said precursor (IIB) is selected from at least one of di-s-butoxyaluminoxy tri-ethoxysilane and hexaethoxydisiloxane.

29. The method of 5 wherein said filler precursor is precursor (IIB).

30. The method of claim 29 wherein, for said filler precursor (IIB), M and M' are silicon, R is an ethyl radical, R' is a methyl radical and the sum of each of x+y and w+z is 3.

31. The method of claim 29 wherein said precursor (IIB) is selected from at least one of di-s-butoxyaluminoxy tri-ethoxysilane and hexaethoxydisiloxane.

32. The method of 6 wherein said filler precursor is precursor (IIB).

33. The method of claim 32 wherein, for said filler precursor (IIB), M and M' are silicon, R is an ethyl radical, R' is a methyl radical and the sum of each of x+y and w+z is 3.

34. The method of claim 32 wherein said precursor (IIB) is selected from at least one of di-s-butoxyaluminoxy tri-ethoxysilane and hexaethoxydisiloxane.

35. The method of claim 7 where said filler precursor is precursor (IIB) and wherein M and M' are silicon, R is an ethyl radical, R' is a methyl radical and the sum of x+y is 3.

36. The method of claim 8 where said filler precursor is precursor (IIB) and wherein M and M' are silicon, R is an ethyl radical, R' is a methyl radical and the sum of x+y is 3.

37. The method of 1 wherein said filler precursor is precursor (IIC).

38. The method of claim 37 wherein, for said filler precursor (IIC), M and M' are silicon, R is an ethyl radical, R' is a methyl radical and the sum of each of x+y and w+z is 3.

39. The method of claim 37 wherein said precursor (IIC) is selected from at least one of bis(triethoxysilyl)methane and bis(triethoxysilyl) ethane.

40. The method of 4 wherein said filler precursor is precursor (IIC).

41. The method of claim 40 wherein, for said filler precursor (IIC), M and M' are silicon, R is an ethyl radical, R' is a methyl radical and the sum of each of x+y and w+z is 3.

42. The method of claim 40 wherein said precursor (IIC) is selected from at least one of the group consisting of bis(triethoxysilyl) methane and bis(triethoxysilyl ethane.

43. The method of 5 wherein said filler precursor is precursor (IIC).

44. The method of claim 43 wherein, for said filler precursor (IIC), M and M' are silicon, R is an ethyl radical, R' is a methyl radical and the sum of each of x+y and w+z is 3.

45. The method of claim 43 wherein said precursor (IIB) is selected from at least one of the group consisting of bis(triethoxysilyl) methane and bis(triethoxysilyl ethane.

46. The method of 6 wherein said filler precursor is precursor (IIC).

47. The method of claim 46 wherein, for said filler precursor (IIC), M and M' are silicon, R is an ethyl radical, R' is a methyl radical and the sum of each of x+y and w+z is 3.

48. The method of claim 46 wherein said precursor (IIB) is selected from at least one of the group consisting of bis(triethoxysilyl) methane and bis(triethoxysilyl ethane.

49. The method of claim 7 where said filler precursor is precursor (IIC) and wherein M and M' are silicon, R is an ethyl radical, R' is a methyl radical and the sum of x+y is 3.

50. The method of claim 8 where said filler precursor is precursor (IIC) and wherein M and M' are silicon, R is an ethyl radical, R' is a methyl radical and the sum of x+y is 3.

51. The method of claim 1 wherein said organosilane is an organopolysulfide material (III) and where Z is Z3 and the alkyl radicals of $R^3$ are selected from ethyl, ethyl, n-propyl, isopropyl, n-butyl and isobutyl radicals.

52. The method of claim 51 wherein, for said organosilane polysulfide material (III), m is an average of from about 2 to about 2.6.

53. The method of claim 51 wherein, for said organosilane polysulfide material (III), m is an average of from about 3.5 to about 4.5.

54. The method of claim 4 wherein said organosilane is an organopolysulfide material (III) where Z is Z3 and the alkyl radicals of $R^3$ are selected from methyl, ethyl, n-propyl, isopropyl, n-butyl and isobutyl radicals.

55. The method of claim 54 wherein, for said organosilane polysulfide material (III), m is an average of from about 2 to about 2.6.

56. The method of claim 54 wherein, for said organosilane polysulfide material (III), m is an average of from about 3.5 to about 4.5.

57. The method of claim 5 wherein said organosilane is an organopolysulfide material (III) where Z is Z3 and the alkyl radicals of $R^3$ are selected from methyl, ethyl, n-propyl, isopropyl, n-butyl and isobutyl radicals.

58. The method of claim 57 wherein, for said organosilane polysulfide material (III), m is an average of from about 2 to about 2.6.

59. The method of claim 57 wherein, for said organosilane polysulfide material (III), m is an average of from about 3.5 to about 4.5.

60. The method of claim 6 wherein said organosilane is an organopolysulfide material (III) where Z is Z3 and the alkyl radicals of $R^3$ are selected from methyl, ethyl, n-propyl, isopropyl, n-butyl and isobutyl radicals.

61. The method of claim 60 wherein, for said organosilane polysulfide material (III), m is an average of from about 2 to about 2.6.

62. The method of claim 60 wherein, for said organosilane polysulfide material (III), m is an average of from about 3.5 to about 4.5.

63. The method of claim 7 wherein said organosilane is an organopolysulfide material (III) and where Z is Z3 and the alkyl radicals of $R^3$ are selected from ethyl, ethyl, n-propyl, isopropyl, n-butyl and isobutyl radicals.

64. The method of claim 63 wherein, for said organosilane polysulfide material (III), m is an average of from about 2 to about 2.6.

65. The method of claim 63 wherein, for said organosilane polysulfide material (III), m is an average of from about 3.5 to about 4.5.

66. The method of claim 8 wherein said organosilane is an organopolysulfide material (III) where Z is Z3 and the alkyl radicals of $R^3$ are selected from methyl, ethyl, n-propyl, isopropyl, n-butyl and isobutyl radicals.

67. The method of claim 66 wherein, for said organosilane polysulfide material (III), m is an average of from about 2 to about 2.6.

68. The method of claim 66 wherein, for said organosilane polysulfide material (III), m is an average of from about 3.5 to about 4.5.

69. The method of claim 1 where the organosilane polysulfide (III) is selected from at least one of:

2,2'-bis(trimethoxysilylethyl) disulfide;
3,3'-bis(trimethoxysilylpropyl) disulfide;
3,3'-bis(triethoxysilylpropyl) disulfide;
2,2'-bis(triethoxysilylethyl) disulfide;
2,2'-bis(tripropoxysilylethyl) disulfide;
2,2'-bi(tri-sec.butoxysilylethyl) disulfide;
3,3'-bis(tri-t-butoxyethyl) disulfide;
3,3'-bis(triethoxysilylethyl tolylene) disulfide;
3,3'-bis(trimethoxysilylethyl tolylene) disulfide;
3,3'-bis(triisopropoxypropyl) disulfide;
3,3'-bis(trioctoxypropyl) disulfide;
2,2'-bis(2'-ethylhexoxysilylethyl) disulfide;
2,2'-bis(dimethoxy ethoxysilylethyl) disulfide;
3,3'-bis(methoxyethoxypropoxysilylpropyl) disulfide;
3,3'-bis(methoxy dimethylsilylpropyl) disulfide;
3,3'-bis(cyclohexoxy dimethylsilylpropyl) disulfide;
4,4'-bis(trimethoxysilylbutyl) disulfide;
3,3'-bis(trimethoxysilyl-3-methylpropyl) disulfide;
3,3'-bis(tripropoxysilyl-3-methylpropyl) disulfide;
3,3'-bis(dimethoxy methylsilyl-3-ethylpropyl) disulfide;
3,3'-bis(trimethoxysilyl-2-methylpropyl) disulfide;
3,3'-bis(dimethoxyphenylsilyl-2-methylpropyl) disulfide;
3,3'-bis(trimethoxysilylcyclohexyl) disulfide;
12,12'-bis(trimethoxysilyldodecyl) disulfide;
12,12'-bis(triethoxysilyldodecyl) disulfide;
18,18'-bis(trimethoxysilyloctadecyl) disulfide;
18,18'-bis(methoxydimethylsilyloctadecyl) disulfide;
2,2-'-bis(trimethoxysilyl-2-methylethyl) disulfide;
2,2'-bis(triethoxysilyl-2-methylethyl) disulfide;
2,2'-bis(tripropoxysilyl-2-methylethyl) disulfide; and
2,2'-bis(trioctoxysilyl-2-methylethyl) disulfide.

70. The method of claim 1 wherein said organosilane polysulfide material (III) is a bis-(3-triethoxysilylpropyl) disulfide.

71. The method of claim 1 wherein said organosilane polysulfide material (III) is selected from at least one of bis-(3-triethoxysilylpropyl) tetrasulfide and bis(3-triethoxysilylpropyl) trisulfide.

72. The method of claim 1 where said organosilane is an alkyl alkoxy silane (IV).

73. The method of claim 72 wherein, for said alkyl alkoxy silane (IV), $R^5$ is an alkyl radical having from 8 to 18 carbon atoms.

74. The method of claim 72 wherein said alkyl alkoxy silane (IV) is selected from at least one of propyltriethoxysilane, methyltriethoxysilane, hexadecyltriethoxysilane, and octadecyltriethoxysilane.

75. The method of claim 4 where said organosilane is an alkyl alkoxy silane (IV).

76. The method of claim 75 wherein, for said alkyl alkoxy silane (IV), $R^5$ is an alkyl radical having from 8 to 18 carbon atoms.

77. The method of claim 75 wherein said alkyl alkoxy silane (IV) is selected from at least one of the group consisting of propyltriethoxysilane, methyltriethoxysilane, hexadecyltriethoxysilane, and octadecyltriethoxysilane.

78. The method of claim 5 where said organosilane is an alkyl alkoxy silane (IV) wherein, for said alkyl alkoxy silane, $R^5$ is an alkyl radical having from 8 to 18 carbon atoms.

79. The method of claim 78 wherein said alkyl alkoxy silane (IV) is selected from at least one of the group consisting of propyltriethoxysilane, methyltriethoxysilane, hexadecyltriethoxysilane, and octadecyltriethoxysilane.

80. The method of claim 6 where said organosilane is an alkyl alkoxy silane (IV) and where, for said alkyl alkoxy silane, $R^5$ is an alkyl radical having from 8 to 18 carbon atoms.

81. The method of claim 80 wherein said alkyl alkoxy silane (IV) is selected from at least one of the group consisting of propyltriethoxysilane, methyltriethoxysilane, hexadecyltriethoxysilane, and octadecyltriethoxysilane.

82. The method of claim 7 where said organosilane is an alkyl alkoxy silane (IV) and wherein, for said alkyl alkoxy silane, $R^5$ is an alkyl radical having from 8 to 18 carbon atoms.

83. The method of claim 82 wherein said alkyl alkoxy silane (IV) is selected from at least one of the group consisting of propyltriethoxysilane, methyltriethoxysilane, hexadecyltriethoxysilane, and octadecyltriethoxysilane.

84. The method of claim 8 where said organosilane is an alkyl alkoxy silane (IV) and where, for said alkyl alkoxy silane, $R^5$ is an alkyl radical having from 8 to 18 carbon atoms.

85. The method of claim 84 wherein said alkyl alkoxy silane (IV) is selected from at least one of propyltriethoxysilane, methyltriethoxysilane, hexadecyltriethoxysilane, and octadecyltriethoxysilane.

86. The method of claim 1 wherein said organosilane is a functional organosilane (V).

87. The method of claim 86 wherein, for said functional organosilane (V), $R^6$ is an ethyl radical, and y is an integer of from 2 to 4.

88. The method of claim 87 wherein said functional organosilane is selected from at least one of the group consisting of 3-amino propyl triethoxysilane, 2-aminoethyl triethoxysilane, 4-aminobutyltriethoxysilane, 3-mercapto propyl triethoxysilane, 2-mercaptoethyl triethoxysilane, 4-mercaptobutyl triethoxysilane, (3-glycidoxypropyl) triethoxysilane, 3-thiocyanato propyl triethoxysilane, vinyltriethoxysilane, ureidopropyltriethoxysilane, 3-isocyanatopropyl triethoxysilane, and N(3-triethoxysilyl) propyl ethylenediamine.

89. The method of claim 4 wherein said organosilane is a functional organosilane (V).

90. The method of claim 89 wherein, for said functional organosilane (V), $R^6$ is an ethyl radical, and y is an integer of from 2 to 4.

91. The method of claim 89 wherein said functional organosilane is selected from at least one of the group consisting of 3-amino propyl triethoxysilane, 2-aminoethyl triethoxysilane, 4-aminobutyltriethoxysilane, 3-mercapto propyl triethoxysilane, 2-mercaptoethyl triethoxysilane, 4-mercaptobutyl triethoxysilane, (3-glycidoxypropyl) triethoxysilane, 3-thiocyanato propyl triethoxysilane, vinyltriethoxysilane, ureidopropyltriethoxysilane, 3-isocyanatopropyl triethoxysilane, and N(3-triethoxysilyl) propyl ethylenediamine.

92. The method of claim 4 wherein said organosilane is a functional organosilane (V).

93. The method of claim 92 wherein, for said functional organosilane (V), $R^6$ is an ethyl radical, and y is an integer of from 2 to 4.

94. The method of claim 92 wherein said functional organosilane is selected from at least one of the group consisting of 3-amino propyl triethoxysilane, 2-aminoethyl triethoxysilane, 4-aminobutyltriethoxysilane, 3-mercapto propyl triethoxysilane, 2-mercaptoethyl triethoxysilane, 4-mercaptobutyl triethoxysilane, (3-glycidoxypropyl) triethoxysilane, 3-thiocyanato propyl triethoxysilane, vinyltriethoxysilane, ureidopropyltriethoxysilane, 3-isocyanatopropyl triethoxysilane, and N(3-triethoxysilyl) propyl ethylenediamine.

95. The method of claim 5 wherein said organosilane is a functional organosilane (V).

96. The method of claim 95 wherein, for said functional organosilane (V), $R^6$ is an ethyl radical, and y is an integer of from 2 to 4.

97. The method of claim 95 wherein said functional organosilane is selected from at least one of the group consisting of 3-amino propyl triethoxysilane, 2-aminoethyl triethoxysilane, 4-aminobutyltriethoxysilane, 3-mercapto propyl triethoxysilane, 2-mercaptoethyl triethoxysilane, 4-mercaptobutyl triethoxysilane, (3-glycidoxypropyl) triethoxysilane, 3-thiocyanato propyl triethoxysilane, vinyltriethoxysilane.

98. The method of claim 6 wherein said organosilane is a functional organosilane (V).

99. The method of claim 98 wherein, for said functional organosilane (V), $R^6$ is an ethyl radical, and y is an integer of from 2 to 4.

100. The method of claim 98 wherein said functional organosilane is selected from at least one of the group consisting of 3-amino propyl triethoxysilane, 2-aminoethyl triethoxysilane, 4-aminobutyltriethoxysilane, 3-mercapto propyl triethoxysilane, 2- mercaptoethyl triethoxysilane, 4-mercaptobutyl triethoxysilane, (3-glycidoxypropyl) triethoxysilane, 3-thiocyanato propyl triethoxysilane, vinyltriethoxysilane, ureidopropyltriethoxysilane, 3-isocyanatopropyl triethoxysilane, and N(3-triethoxysilyl) propyl ethylenediamine.

101. The method of claim 7 wherein said organosilane is a functional organosilane (V).

102. The method of claim 101 wherein, for said functional organosilane (V), $R^6$ is an ethyl radical, and y is an integer of from 2 to 4.

103. The method of claim 101 wherein said functional organosilane is selected from at least one of the group consisting of 3-amino propyl triethoxysilane, 2-aminoethyl triethoxysilane, 4-aminobutyltriethoxysilane, 3-mercapto propyl triethoxysilane, 2-mercaptoethyl triethoxysilane, 4-mercaptobutyl triethoxysilane, (3-glycidoxypropyl) triethoxysilane, 3-thiocyanato propyl triethoxysilane, vinyltriethoxysilane, ureidopropyltriethoxysilane, 3-isocyanatopropyl triethoxysilane, and N(3-triethoxysilyl) propyl ethylenediamine.

104. The method of claim 8 wherein said organosilane is a functional organosilane (V), wherein $R^6$ is an ethyl radical, and y is an integer of from 2 to 4.

105. The method of claim 104 wherein said or organosilane is a functional organosilane (V) selected from at least one of the group consisting of 3-amino propyl triethoxysilane, 2-aminoethyl triethoxysilane, 4-aminobutyltriethoxysilane, 3-mercapto propyl triethoxysilane, 2-mercaptoethyl triethoxysilane, 4-mercaptobutyl triethoxysilane, (3-glycidoxypropyl) triethoxysilane, 3-thiocyanato propyl triethoxysilane, vinyltriethoxysilane, ureidopropyltriethoxysilane, 3-isocyanatopropyl triethoxysilane, and N(3-triethoxysilyl) propyl ethylenediamine.

106. The method of claim 1 wherein said elastomer (A) is selected from at least one of the group consisting of cis 1,4-polyisoprene, cis 1,4-polybutadiene, isoprene/butadiene copolymers, styrene/butadiene copolymers including emulsion polymerization prepared copolymers and organic solvent solution polymerization prepared copolymers, styrene/isoprene copolymers, 3,4-polyisoprene, trans 1,4-polybutadiene, styrene/isoprene/butadiene terpolymer, high vinyl polybutadiene having from about 35 to about 90 percent vinyl groups.

107. The method of claim 1 wherein the elastomer component of elastomer (B) is an organic solvent polymerization prepared elastomer selected from at least one of the group consisting of cis 1,4-polyisoprene, cis 1,4-polybutadiene, isoprene/butadiene copolymers, styrene/butadiene copolymers including emulsion polymerization prepared copolymers and organic solvent solution polymerization prepared copolymers, styrene/isoprene copolymers, 3,4-polyisoprene, trans 1,4-polybutadiene and styrene/isoprene/butadiene terpolymers.

108. The method of claim 1 wherein said tin coupled elastomer is the product of reacting at least one conjugated diene or by reacting styrene together with at least one of the group consisting of conjugated diene, wherein said diene is selected from 1,3-butadiene and isoprene, in an organic solvent solution and in the presence of an organolithium based catalyst followed by reacting the live polymer with at least one compound having the formula: $R^7_{4-n}SnX_n$, wherein n is an integer from 1 to and including 4, X is chlorine; and $R^7$ is an alkyl radical selected from methyl, ethyl, propyl and butyl radicals.

109. The method of claim 1 wherein said filler precursor is at least one material selected from at least one of the group consisting of tetraethoxy ortho silicate, titanium ethoxide, titanium n-propoxide, aluminum tri-sec butoxide, zirconium t-butoxide, zirconium n-butoxide, tetra-n-propoxy zirconium and boron ethoxide, methyl triethoxy silicate and dimethyl diethoxy silicate, di-s-butoxyaluminoxy triethoxysilane and hexaethoxydisiloxane, bis(triethoxysilyl) methane and bis(triethoxysilyl)ethane.

110. The method of claim 109 wherein bis(3-trialkoxysilylalkyl)polysulfide is reacted with said filler/filler precursor prior to the completion of the condensation reaction.

111. The method of claim 1 wherein said condensation promoter is selected from at least one of the group consisting of (a) basic promoters, (b) acidic promoters, (c) metal oxide and metal salt promoters, and (d) organotin compound promoters.

112. The method of claim 1 wherein said condensation promoter is selected from at least one of the group consisting of ammonia, ammonium hydroxide, N-butylamine, terbutylamine, tetrahydrofuran (THF), sodium fluoride, pentaethylene hexamine, diaminopropane, diethylenetriamine, triethylenetetramine, poly(allylaminehydrochloride), poly (L-lysine hydrobromide), poly(L-arginine hydrochloride), poly(L-histidine hydrochloride), phosphoric acid, acetic acid, hydrofluoric acid, sulfuric acid, zinc oxide, aluminum oxide, zinc sulfate, aluminum sulfate, zinc stearate, aluminum stearate, bis(2-ethylhexanoate) tin and bis (neodecanoate) tin.

* * * * *